Patented July 26, 1927.

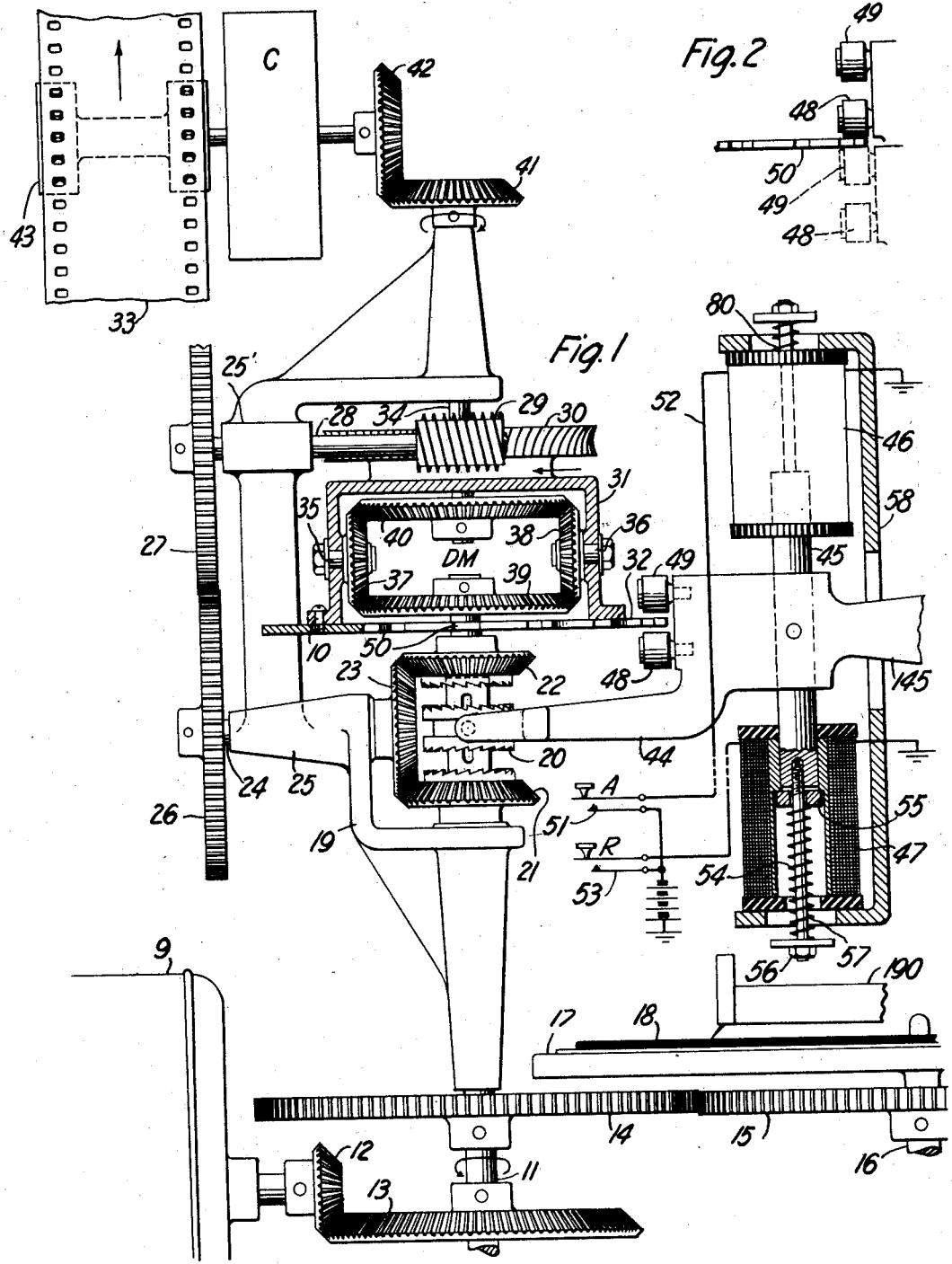

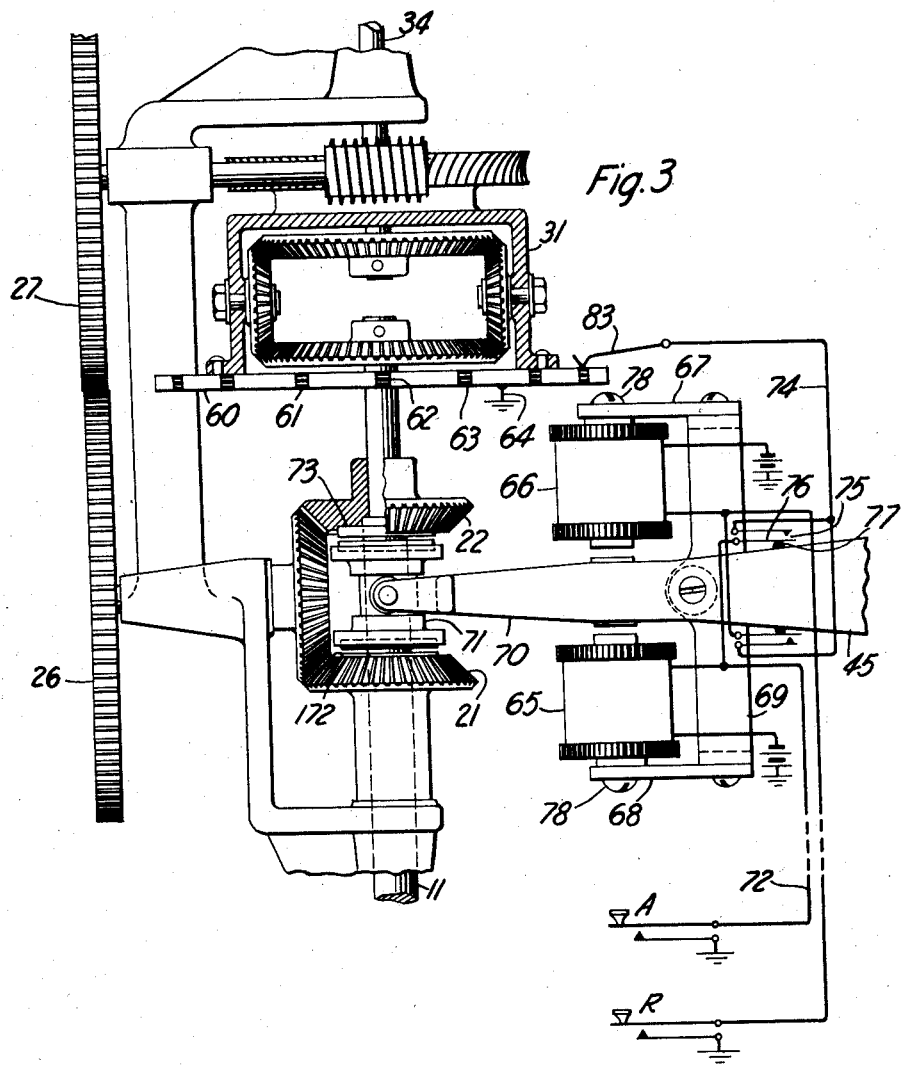

1,637,161

UNITED STATES PATENT OFFICE.

CHARLES D. RICHARD, OF WEST NEW BRIGHTON, NEW YORK, ASSIGNOR TO WESTERN ELECTRIC COMPANY, INCORPORATED, OF NEW YORK, N. Y., A CORPORATI NEW YORK.

SYNCHRONIZING MECHANISM.

Application filed December 29, 1924. Serial No. 758,788.

This invention relates to talking moving picture machines and more specifically to a synchronizing mechanism particularly well adapted for use in such machines.

The object of this invention is to provide a mechanism which will be efficient, cheap to manufacture and wherein a plurality of records may be moved in synchronism in a simple manner.

A feature of the invention is the provision of a pair of electromagnets controlled by a pair of keys, these electromagnets being arranged to move a continuously acting but normally ineffective clutch member in either direction in operative relation with a gear reversing mechanism for changing the relative position of a plurality of records.

Another feature is the provision of a manually operable device on the synchronizing mechanism for also controlling the movement of the clutch member in addition to the keys, which keys may be located at a distance from the machine.

Another feature is the provision of means operable through the movement of the gear reversing mechanism for automatically disengaging the clutch when the records are brought in proper relation to each other.

Other features of invention and advantage will appear from the following description and by the claims appended thereto, reference being had to the accompanying drawings in which:

Fig. 1 is a front assembly view of the synchronizing mechanism;

Fig. 2 is a partial assembly view of the clutch operating lever and latching disc; and Fig. 3 is a modification of the synchronizing mechanism shown in Fig. 1.

The moving picture machine in which this synchronizing mechanism is particularly well adapted for use generally comprises a source of power such as an electric motor 9 which may be mechanically coupled to a shaft 11 by means of any suitable speed reducing mechanism such as gears 12 and 13. On shaft 11 and adjacent gear 13 there is securely mounted a gear 14 which meshes with a gear 15 mounted on the shaft 16 of a phonograph turn table 17 adapted to carry a sound record 18 which cooperates with the needle of a phonograph tone arm 190 for reproducing the sound register on the record.

The shaft 11 is rotatably mounted in the lower end bearing portion of bracket 19 and carries a two faced toothed clutch member 20 loosely keyed thereon and adapted to be moved in operable relation with the toothed portions of two oppositely disposed gears 21 and 22, which are freely mounted on the shaft 11. A pinion 23 meshes with oppposedly disposed pinions 21 and 22 and cooperates therewith to form a reversing mechanism the function of which will be hereinafter described. The pinion 23 is securely mounted on one end portion of shaft 24 which is rotatably mounted in the bearing portion 25 of bracket 19. On the other end portion of shaft 24 there is securely mounted a gear 26 which meshes with gear 27, securely mounted on one end portion of a shaft 28 rotatably mounted in the bearing portion 25' of bracket 19. On the other end of shaft 28 there is securely mounted a worm screw 29 which meshes with worm gear 30 secured to a rotatable casing 31 which is adapted for housing a differential gear mechanism D M. This casing carries a notched disc 32 which cooperates with an associated lever member 44 for controlling the relative movement of the film 33 with respect to the sound record 18 in a manner that will be hereinafter described.

The disc 32 is secured to one side of casing 31 by means of a number of screws 10 and is rotatably mounted on the upper end portion of shaft 11. The other side of casing 31 is rotatably mounted on the lower end portion of shaft 34 which is rotatably mounted in the upper end bearing portion of bracket 19, this shaft carries at one end portion a bevel gear 40 which meshes with two planetary gears 37 and 38 which in turn mesh with a gear 39 securely mounted on the upper end portion of shaft 11. Planetary gears 37 and 38 are rotatably mounted on their respective studs 35 and 36 which are secured to the casing 31 for moving the planetary gears 37 and 38 bodily with the casing 31 upon each movement of the gear reversing mechanism.

On the upper end portion of shaft 34 there is secured a pinion 41 which meshes with pinion 42 adapted to actuate a sprocket wheel 43 and the film 33 carried thereby through the movement of any well known intermittent mechanism which may be housed in the casing C.

The continuously rotating clutch member 20, is adapted to be moved in operable relation with the clutch portions of pinions 21 and 22 by means of a lever 44 which may be operated manually through its handle portion 145 or at distance through the operation of the advance and retard keys A, and R in the operating circuit of magnets 46 and 47. Magnets 46 and 47 are mounted coaxially on laterally extending arms of bracket 58 and are adapted to impart a reciprocating movement to the shaft 45 on which the lever 44 is secured for moving the clutch member 20 in operable relation with its respectively associated clutch portion on the gears 21 and 22. This lever carries a pair of parallelly disposed rollers 48 and 49 which cooperate with the toothed disc 32 for holding the lever 44 and the clutch member 20 carried thereby in operable relation with the toothed portions of pinions 21 and 22. The disc 32 may carry any number of teeth 50 shown in Figs. 1 and 2, depending upon the ratio of the gears included in the gear train and the length of the pictures on the film.

Key A controls the energization of magnet 46 which energizes through a circuit from grounded battery, contact 51, in contact with the key A when depressed, lead 52, winding of magnet 46 to ground. The energization of magnet 46 attracts the shaft 45 and thereby moves the lever 44 and the continuously rotating clutch member 20 in operable relation with the toothed portion of pinion 22 against the resistance of spring 54 which has one end in abutment with the stop 55 and the other end against the flange portion of nut 56 screwed on the free end portion of the stem 57 which is carried by the shaft 45. Upon the energization of magnet 46 and the consequent movement of lever 44, the roller 48 is moved in position shown in Fig. 2 in locking relation with one tooth of disc 32. Magnet 47 is energized through a circuit from grounded battery, spring 53, in contact with key R, winding of relay 47 to ground. The energization of this magnet attracts the reciprocating shaft 45 and moves the lever 44 and the clutch member 20 carried thereby in operable relation with the toothed portion of gear 21. The lever 44 and the clutch member 20, are held in operated position through the engagement of the roller 49 in locking relation with the disc 32 as indicated by the dotted line in Fig. 2.

The operation of this synchronizing mechanism is as follows: The movement of shaft 11 in the direction indicated by the arrow normally rotates the gear 41 in an opposite direction through the operation of the differential mechanism D M in an obvious manner and moves the film 33 in the direction indicated by the arrow. Now supposing that it is desired to adjust the position of the film 33 with respect to the sound record 18 and that the film 33 is in advance of the sound record. The closing of the retard key R causes the energization of magnet 47 which moves the lever 44 and the continuously rotatable clutch member 20, in engagement with the clutch portion of gear 21. The movement of shaft 11 is thereby imparted to casing 31 which moves in the direction indicated by the arrow by means of gears 26 and 27, the worm screw 29 and the worm wheel 30. The movement of casing 31 and the planetary gears 37 and 38 bodily moving therewith cause a retard movement to the shaft 34 an amount equal to the angular movement of casing 31 and thereby a retard movement to the film 33. Similarly the energization of magnet 46 in the circuit above referred to, moves the lever 44 and the clutch member 20 carried thereby in operable relation with the toothed portion of pinion 22. The reverse movement of the casing 31 imparted by the pinion 22 causes the planetary gears 37 and 38 to impart an advance movement to the film 33 with respect to the sound record in the manner described in the above example. The movement of lever 44 against the resistance of spring 80 carries the roller 49 in locking relation with the toothed disc 32 as shown by the dotted line in Fig. 2. The teeth of the disc 50 are each of sufficient length to hold the lever and the clutch 20 in operable relation with the reversing mechanism to impart an angular movement to casing 3, corresponding to a linear distance of one picture on the film wherein the clutch member 20 is automatically disengaged from pinions 21 and 22 as the case may be by means of their respectively associated springs 54 and 80 which move the lever in normal nonoperated position as shown in Fig. 1 upon the passing of a notch 32 in registry with the rollers 48 and 49. Through this mechanism, it is obvious that by maintaining the magnets 46 and 47 energized through the closing of their respective keys, the clutch member 20 may be held in operable relation with the toothed clutch portions of gears 21 and 22 for imparting a continuous retard or advance relative movement to the film with respect to the sound record.

In the modification shown in Fig. 3, the disc 60 is preferably made of conducting material on the periphery of which a plurality of equally spaced insulating segments 61, 62, 63, etc., are secured. The disc 60 is grounded, as shown at 64 and its contacting segments are thereby adapted to form a part of the operating circuits of magnets 65 and 66. Magnets 65 and 66 are preferably mounted coaxially on the laterally extending arms 67 and 68 of the yoke shaped bracket 69 and are securely held thereto by means of screws 78. A lever 70 is pivotally mounted in the center portion of bracket 69 and is disposed in attractable relation with the pole pieces of magnets 65 and 66. The free end portion of lever 70 engages a double faced friction clutch member 71 adapted to be moved in operable relation with opposedly disposed friction clutch portions 172 and 73 carried by the pinions 21 and 22, respectively.

The adjusting movement of driven shaft 34 with respect to shaft 11 may be manually controlled by means of the handle lever 145 integrally formed with lever 70 or through the depression of the advance and retard keys A and R in the following manner: Upon the depression of advance key A, a circuit for magnet 65 is closed from ground, contact of the key A, lead 72, winding of magnet 65 to battery and ground. Magnet 65 is energized in this circuit and moves the lever 70 and the clutch 71 carried thereby in operable relation with the clutch portion of pinion 21 for actuating the casing 31 and the disc 60. Upon a small angular movement of disc 60, a holding circuit for magnet 65 extends from ground 64, a segmental portion of disc 60, wiper 83 in contact therewith, lead 74, closed contact 75, winding of magnet 65 to battery and ground. The passing of an insulating segment 61, 62, etc., in registry with wiper 83 opens the circuit of magnet 65 which deenergizes to permit the lever 70 and the clutch 71 to return in normal position through the tension of spring 76 in abutment with the insulating portion 77 carried by the handle portion of lever 70.

It is obvious that the energization of magnet 66 through the depression of its associated retard key R is effective to change the relative position of shaft 34 with respect to shaft 11 in an opposite direction and in a manner similar to that above described for effecting an advance movement of shaft 34. It is to be noted that while one of the keys is held depressed the insulating segments 61, 62, etc., will be ineffective to interrupt the energization of the magnets. This permits to impart an unlimited continuous angular adjusting movement to the shaft 34 with respect to the shaft 11.

What is claimed is:

1. In a reproducing machine, a sound record, a picture record adapted to be moved in synchronism therewith, a gear mechanism therefor, including a normally ineffective driving member, a pair of electromagnets successively operable for moving said member in positions for imparting movement to said mechanism in opposite directions, a pair of keys for controlling the energization of said magnets, circuits each including one of said magnets and one of said keys, and means for automatically returning the driving member in position ineffective with respect to the gear mechanisms for controlling the extent of the synchronizing movement of said picture record.

2. In a reproducing machine, records of different characters, a mechanism for changing the position of one of said records with respect to the other in two directions, a member for automatically controlling the extent of movement of said mechanism in said directions, and manually operable means for rendering said member effective with respect to said mechanism.

3. In a reproducing machine, a driving shaft, a driven shaft adapted to be moved in synchronism with said driving shaft, normally ineffective means for operating said driven shaft in one direction, means for operating said driven shaft in another direction, a plurality of manually operable means for causing the operation of either of said first and second mentioned means, and means for automatically stopping the synchronizing operation of said driven shaft in either of said directions.

4. In a reproducing machine, a sound record, a picture record, adapted to be moved in synchronism with said sound record, a gear reversing mechanism therefor including normally disengaged driving and driven clutch members, a pair of electromagnets for engaging the driving with the driven clutch members for causing the operation of said mechanism, and means operable through the movement of said mechanism for locking and automatically releasing the driving clutch member for controlling the extent of the relative movement of said records one with respect to the other.

5. In a reproducing machine, a plurality of movable records, normally ineffective means for changing the position of said records relative to each other, said means including a duplex driving clutch member, electromagnetic means for moving said driving member into position effective with respect to the first mentioned means for changing the position of said records, and other means for controlling the extent of the change of movement of said records.

6. In a reproducing machine, a sound record, a picture record adapted to be moved in synchronism with said sound record, a normally ineffective reversing mechanism therefor including a continuously rotating member, a pair of electromagnets, circuits for said magnets, a lever responsive to the energization of said magnets for moving said rotating member in position effective with respect to said reversing mechanism, a pair of keys in said circuit for controlling the operation of said magnets for holding the rotating member in position effective with respect to said mechanism and automatically operable means for limiting the extent of the relative movement of one of said records with respect to the other record upon the release of said keys.

7. In a synchronizing mechanism, a driving and a driven shaft, a reversible gear train associated with said driven shaft, normally ineffective means carried by said driving shaft movable in positions for causing the operation of said gear train for modifying the movement of said driven shaft with respect to the driving shaft in different directions, and a plurality of electromagnets for moving the first mentioned means in said positions.

8. In a synchronizing mechanism, a driving and a driven shaft, a gear mechanism, clutch members carried by a number of gears in said mechanism, a continuously rotating double faced clutch member adapted to be moved in engagement with said members for operating said mechanism, an electromagnet for moving said clutch member in engagement with one of the first mentioned clutch members for changing the position of the driven shaft with respect to the driving shaft in one direction, another magnet for moving the double faced clutch member in engagement with the other of said clutch members for changing the position of the driven shaft with respect to the driving shaft in another direction, and a common member for controlling the extent of change of position of said driving shaft in each of said directions.

In witness whereof, I hereunto subscribe my name this 23rd day of December, A. D., 1924.

CHARLES D. RICHARD.